Figure 5:
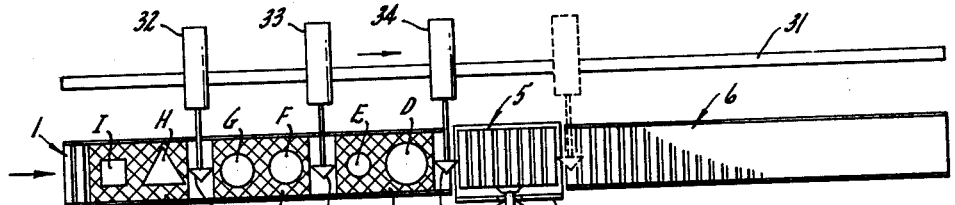
Figure 6:
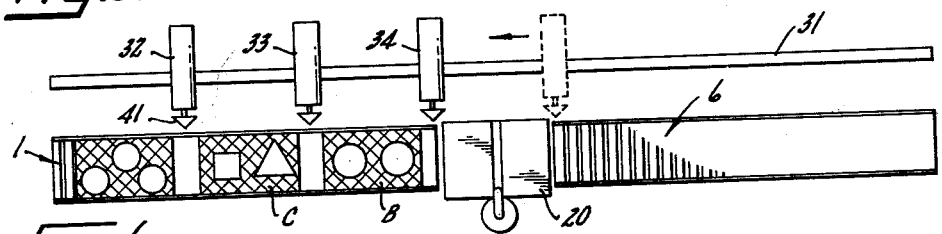
Figure 7:
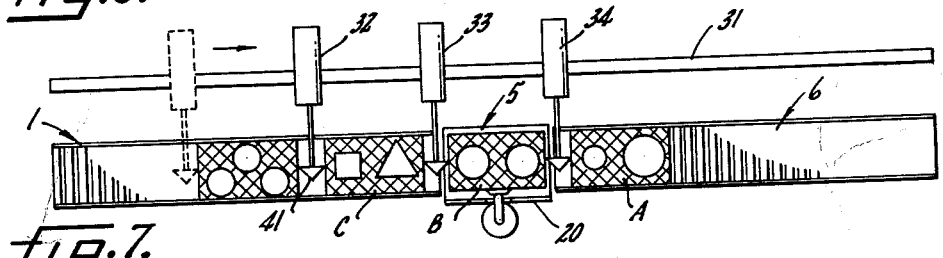

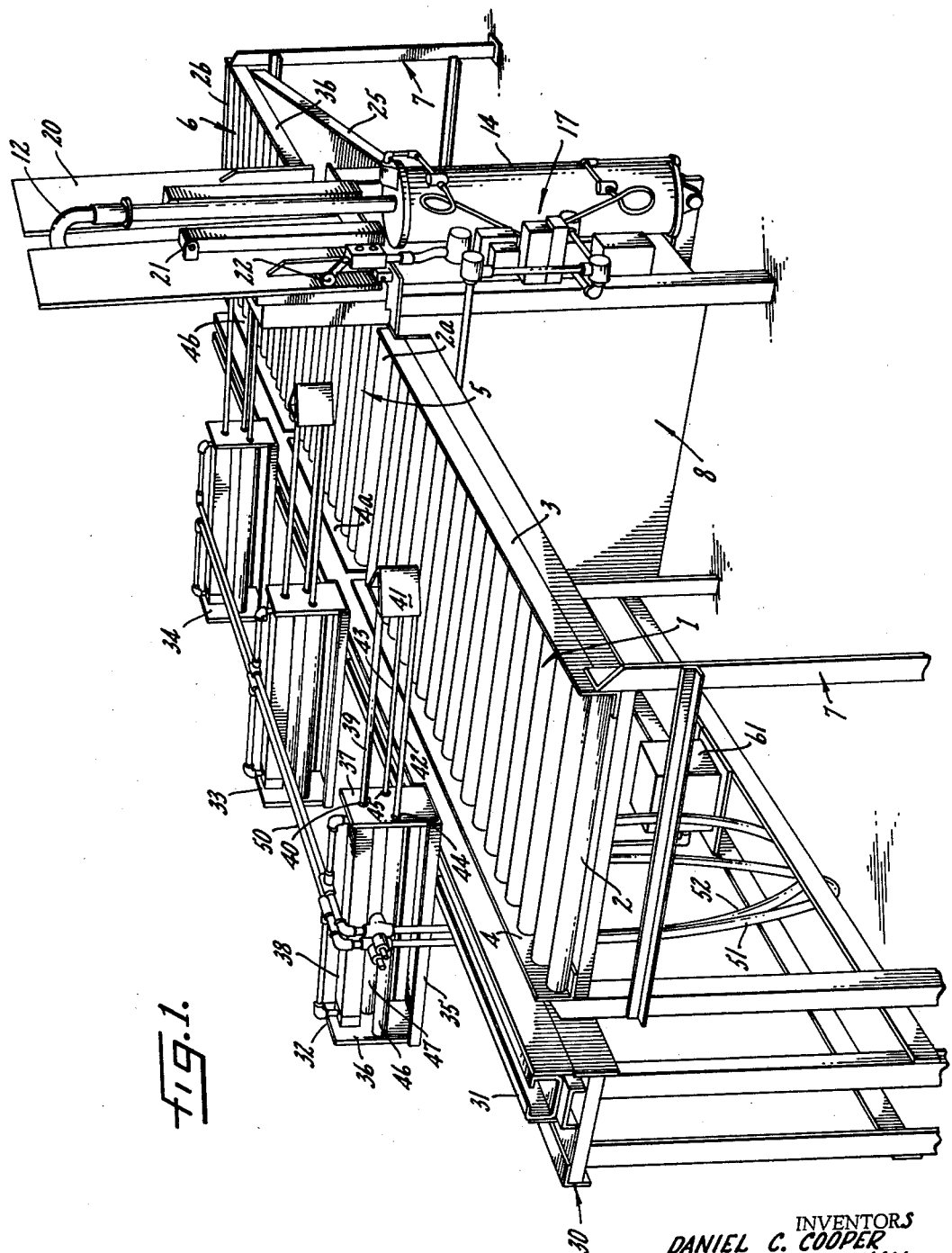

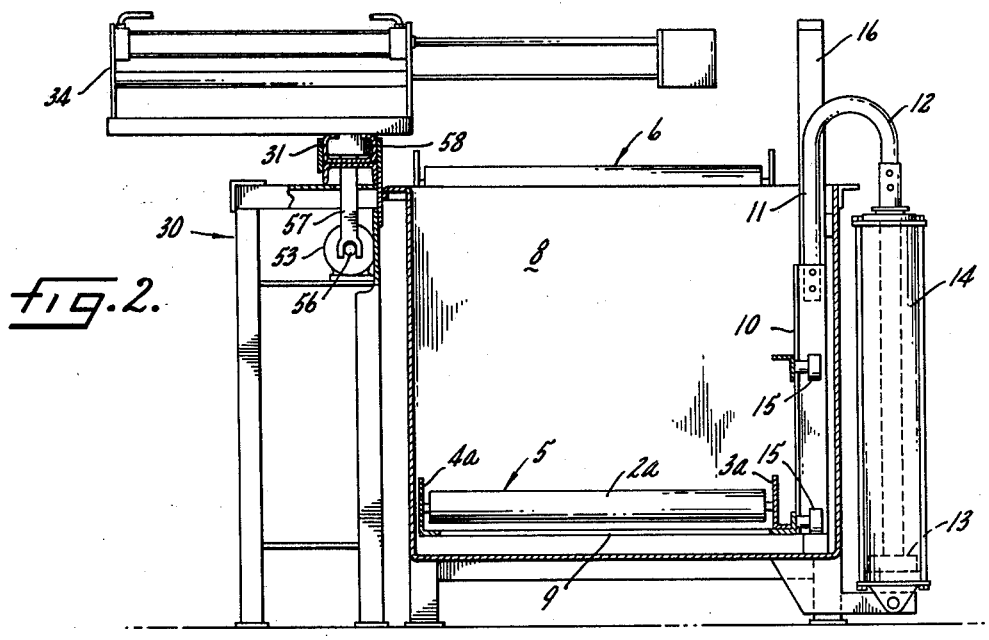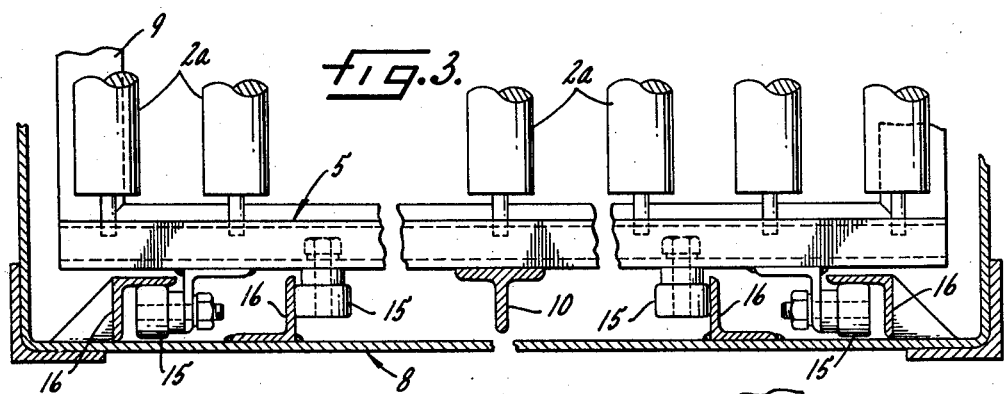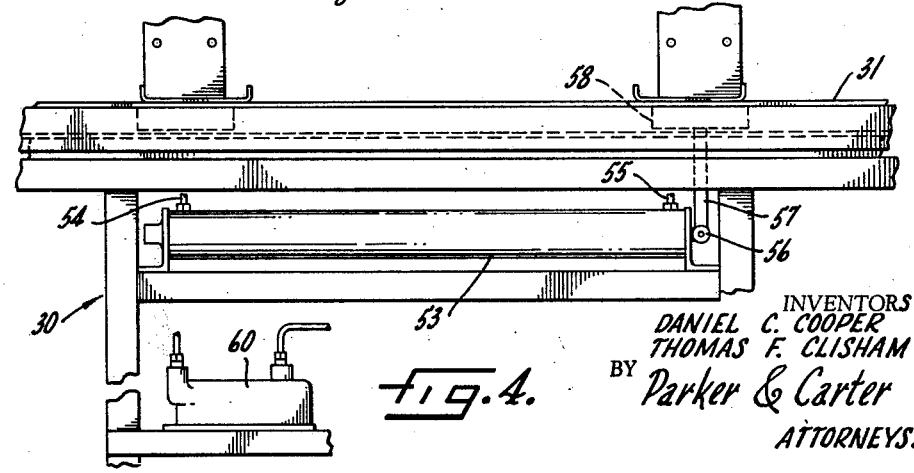

INVENTORS
DANIEL C. COOPER
THOMAS F. CLISHAM
BY Parker & Carter
ATTORNEYS.

United States Patent Office 3,131,703
Patented May 5, 1964

3,131,703
AUTOMATIC DIPPING ASSEMBLY
Daniel C. Cooper and Thomas F. Clisham, Chicago, Ill., assignors to Daniel C. Cooper, doing business as D. C. Cooper Co., Chicago, Ill.
Filed May 28, 1962, Ser. No. 198,127
2 Claims. (Cl. 134—133)

This invention relates to automatic dipping assemblies and has particular relation to an automatic conveying and dipping assembly.

One purpose of the invention is to provide a conveyor surface having a vertically movable portion thereof to facilitate dipping of articles conveyed on said surface.

Another purpose is to provide an automatic conveying assembly having means for automatically moving and positioning articles on said surface.

Another purpose is to provide a conveying and dipping assembly having a conveyor surface, means for moving articles along said surface and for moving articles laterally of said surface to dip the same.

Another purpose is to provide a dipping and conveying assembly having a dipping tank or reservoir and means for returning portions of a dipping solution to said reservoir.

Another purpose is to provide a conveyor surface having an intermediate portion thereof laterally movable therefrom and means for moving and positioning articles on said surface.

Another purpose is to provide a conveying and dipping assembly having a conveyor surface and an intermediate portion thereof laterally movable in relation thereto in combination with means for positioning and moving articles along said surface and to and from said intermediate portion.

Other purposes will appear from time to time during the course of the specification and claims.

The invention is illustrated more or less diagrammatically in the accompanying drawings, wherein:

FIGURE 1 is a perspective view of the assembly;
FIGURE 2 is an end view;
FIGURE 3 is a detail view on an enlarged scale;
FIGURE 4 is a detail view on an enlarged scale; and
FIGURES 5-9, inclusive, are top plan views diagrammatically illustrating the operation of the assembly.

Like parts are indicated by like numerals throughout the specification and drawings.

Referring now to the drawings, and particularly to FIGURE 1 thereof, the numeral 1 illustrates generally a conveyor surface. The surface 1 is comprised of a plurality of parallel rollers 2 rotatably mounted between a pair of side rails 3, 4. The conveyor surface 1 has an intermediate portion 5 formed of a plurality of parallel rollers 2a rotatably mounted between side rails 3a, 4a. A continuing section 6 of conveyor surface 1 is formed of a plurality of parallel rollers 2b rotatably supported between a pair of parallel side rails 3b, 4b. It will be observed that the side rais 3-4b are in alignment and that the rollers 2-2b are of the same linear extension and together form the continuing roller or conveyor surface 1.

The side rails 3-4b are supported on any suitable frame supports indicated generally by the numeral 7.

Positioned intermediate the ends of surface 1 and beneath the conveyor surface portion 5 is a dipping tank 8. The inner ends of rails 3, 4 and 3b, 4b adjacent conveyor surface 5 may, for convenience, be supported on an upper portion of the tank 8.

The conveyor surface 5, as may be best seen, perhaps, in FIGURE 2, is dimensioned to fit within the tank 8 for vertical reciprocal action therein. The surface portion 5 may include, for example, a frame indicated generally by the numeral 9 which may support the rollers 2a and side rails 3a, 4a and to which is fastened a vertically extending, centrally positioned member 10. The member 10 is in turn suitably connected to an uprising member 11 which is in turn bent upon itself as at 12 for attachment to a piston 13 within a pneumatic or hydraulic cylinder or power means 14. The member 10, 11, 12 thus forms an elongated piston rod with a portion movable into and out of tank 8 and a portion movable into and out of the cylinder of power means 14. As may be best seen in FIGURES 2 and 3, roller elements 15 are carried by the frame 9 and conveyor section 5 for suitable engagement with track elements 16 mounted within the tank 8 and rising upwardly therefrom a short distance.

Indicated generally at 17 is a series of controls for the operation of power means 14 to cause raising and lowering of the intermediate tray section 5 of conveyor surface 1 from a position above the upwardly open tank 8 and in alignment with surface 1 to a position adjacent the bottom of tank 8, as indicated in FIGURE 2. The said controls may be employed to reciprocate the intermediate conveyor portion 5 between points adjacent the bottom of tank 8.

Pivotally mounted along one upper edge of the tank 8 is a cover 20. The cover 20 is held in an upwardly disposed, forwardly inclined, open position by suitable hook elements such as is illustrated at 21, the same being effective to release the cover and to allow the cover 20 to drop by gravity into closed position on tank 8 whenever a thermo-responsive fuse link secured to hooks 21 is sufficiently heated by the presence of flame within tank 8. A "dead man's" control lever 22 is continuously urged against a surface of cover 20 and is effective immediately upon the movement of cover 20 toward closed position to actuate the controls 17 and to move the conveyor tray section 5 downwardly into its lowermost position within tank 8 and to retain conveyor section 5 within tank 8 with the cover 20 in closed position. The operation of the cover 20 and control 22 is also described in United States Letters Patent 2,724,392.

Positioned in an inclined plane beneath conveyor segment 6 is a return trough 25, the same being downwardly inclined toward a lower portion of tank 8 to receive from between rollers 2b any of the dipping solution which may drip from articles moving onto conveyor section 6 and to return said drippings to the tank 8 through a suitable opening (not shown) in the wall of tank 8 above the level of dipping solution therein and thus to return the same to the dipping bath within tank 8.

An additional or sub-frame 30 has mounted along a longitudinal upper edge thereof a track 31. The track 31 is positioned in parallel relationship with side rails 4, 4a, 4b. While an additional frame 30 is illustrated in the drawings, it will be realized that the track 31 may be suitably mounted on the same frame employed to support conveyor 1 without departing from the nature and scope of the invention.

Mounted for reciprocal movement within track 31 is a plurality of impeller or pusher elements 32, 33, 34. While three such elements are illustrated, it will be understood that the number thereof may vary without departing from the nature and scope of the invention.

Since the elements 32, 33 and 34 are substantially identical, it will suffice to describe one such element, it being understood, for convenience, that the description of element 32 is equally applicable to elements 33 and 34.

Element 32 comprises a base plate 35 and a pair of spaced upstanding end plates 36, 37. Cylinder member 38 is mounted between and supported on the upper inner surfaces of opposed plates 36, 37. A piston rod 39 extends from a point within cylinder 38 through a suitably sealed aperture 40 in end plate 37 and is secured at its outer end to a conically structured contact member 41. A pair of spaced parallel guide arms 42, 43 have their outer ends secured to member 41 and extend through suitable apertures 44, 45, respectively, in plate 37. The guide arms 42, 43 have their inner ends movable within cylindrical guide housings 46, 47 respectively, the said housings extending between and having their opposite ends supported by the inner surfaces of plates 36, 37. It will be understood that a suitable piston element is secured to piston rod 39 for reciprocation within cylinder 38 and that similar heads or enlargements may be movable within guide housings 46, 47. Carried by each of the elements 32, 33, 34 is a fluid pressure distributing manifold indicated generally by the numeral 50. The manifold 50 may be formed of suitable pipe conduits having branch conduits communicating with the opposite ends of cylinders 38 and adapted to deliver and receive fluid pressure, such as pneumatic or hydraulic fluid pressure, to and from said opposite ends.

Elongated flexible hose conduits 51, 52 are suitably connected to manifold 50 for connection with a fluid pressure control system including a fluid pressure power means such as the piston-and-cylinder structure illustrated at 53 in FIGURE 4. The connections indicated at 54, 55 are provided for connecting power means 53 into said fluid pressure control system. A piston is reciprocal within cylinder 53 in the well-known manner and is secured to a piston rod, the outer end of which is shown at 56, and to which outer end is fastened an upstanding arm 57. The arm 57 is secured to a runner element 58 within track 31 which is in turn secured to each of the impeller or positioning elements 32, 33 and 34.

Suitable control elements 60 are provided to automatically and sequentially control the operation of power means 53 to produce simultaneous longitudinal movement of elements 32, 33, 34 along track 31 in either of two opposite directions. A set of suitable controls 61 are supplied for timing and controlling the reciprocal movement of piston rods 39 with guide arms 42, 43 and contact members 41 laterally across conveyor surface 1 in a plane overlying said conveyor surface.

The use and operation of the invention are as follows:

In FIGURES 5–9, inclusive, the operation of the invention is illustrated. While the illustrations of FIGURES 5–9 are diagrammatic or schematic, it will be realized that conveyor surfaces 1, 5 and 6 correspond to those illustrated in FIGURES 1–4. Similarly, the elements illustrated at 32, 33, 34 of FIGURES 5–9 correspond to the elements indicated by these numerals in FIGURES 1–4.

In FIGURES 5–9, a set of three open wire mesh baskets, indicated generally by the letters A, B and C, are positioned on conveyor section 1. The baskets A, B and C have therewithin a number of articles, indicated by the letters D, E, F, G, H and I.

Figure 8:
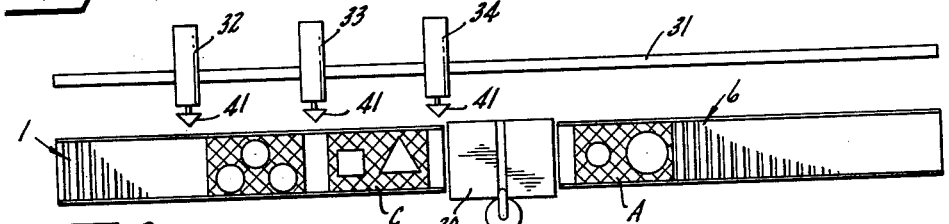
Figure 9:
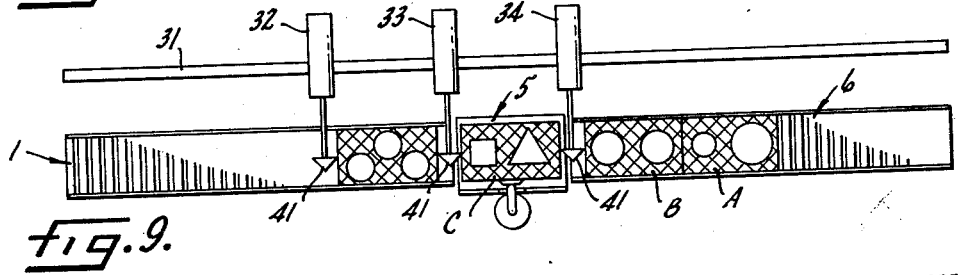

The cover 20 normally remains open. Should a fire occur in tank 8, however, it may be contained and snuffed out by a rapid, automatic closing of the cover, without need of human intervention. In FIGURE 8 we illustrate the result of the occurrence of a fire within tank 8. In such event, the tray or intermediate conveyor section 5, with the basket B, for example, thereon is moved into and held at its lowermost position entirely within tank 8 by the automatic intervention of control member 22 as the cover 20 starts toward closed position.

It will be understood that baskets or similar containers such as those illustrated at A, B, and C, are delivered to one end of conveyor surface 1 by any suitable means, either manually or by additional conveyor means, and that the said baskets are removed from the downstream end of conveyor section 6 by any suitable similar means.

Thus, the sequence involves the forward motion of contactor elements 41 in a plane overlying conveyor 1, the longitudinal movements of elements 32, 33 and 34 to transport the baskets A and B longitudinally of the conveyor surface and to position basket A on conveyor section 5. Thereupon, the contact elements 41 are withdrawn by power means 38. The conveyor section 5 moves downwardly into tank 8 and, when desired, reciprocated within tank 8, elements 32, 33 and 34 are returned to the position illustrated in full lines in FIGURES 5 and 6 and the sequence is repeated to move basket A off conveyor section 5 (which has been returned to its conveyor level above tank 8) onto conveyor section 6 and simultaneously to move basket B onto conveyor section 5 and basket C into position adjacent to tank 8.

Whereas a preferred embodiment of the invention has been illustrated and described, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

We claim:

1. A conveyor and dipping assembly comprising a frame, an elongated conveyor mounted on said frame, a dipping tank adjacent said conveyor, a portion of said conveyor being positioned for movement into and out of said tank, a track paralleling said conveyor, a plurality of pusher elements movable on said track and longitudinally spaced therealong, each of said pusher elements including a contact member movable into and out of a position overlying said conveyor, power means connected to said conveyor portion, pusher elements and contact members and control means associated with said power means to cause timed, sequential movement of said conveyor portion into and out of said tank, said pusher elements along said track and said contact elements into and out of a position overlying said conveyor.

2. In a conveyor and dipping assembly, an elongated conveyor surface, a dipping station intermediate the ends of said surface, a pusher assembly positioned adjacent said conveyor surface, said assembly comprising a track, a plurality of pusher elements movable in spaced relation along said track in parallel relationship with said conveyor, power means secured to said pusher elements for moving the same in alternate opposite directions on said track, each of said pusher elements having a contact element movable into and out of a position overlying said conveyor surface and power means on said pusher elements for moving said contact elements into and out of said last-named position, said contact elements being spaced apart one from the other a distance substantially equal to the longitudinal extension of said dipping station.

References Cited in the file of this patent
UNITED STATES PATENTS

| | | |
|---|---|---|
| 1,215,107 | Bush | Feb. 6, 1917 |
| 1,438,680 | Barron | Dec. 12, 1922 |
| 2,011,839 | Anderson | Aug. 20, 1935 |
| 2,792,680 | Edel | May 21, 1957 |
| 2,965,369 | Acker | Dec. 20, 1960 |